United States Patent [19]

Armstrong

[11] 3,907,178

[45] Sept. 23, 1975

[54] ENCLOSED LOCK GATE VALVE

[76] Inventor: George W. Armstrong, P.O. Box 507, Fairborn, Ohio 45324

[22] Filed: Nov. 4, 1974

[21] Appl. No.: 520,625

[52] U.S. Cl. .............................................. 222/504
[51] Int. Cl.² ........................................ B65G 65/62
[58] Field of Search ............ 222/445, 504, 183, 185

[56] References Cited
UNITED STATES PATENTS

| | | | |
|---|---|---|---|
| 1,938,942 | 12/1933 | Swartz | 222/445 X |
| 1,969,091 | 8/1934 | Miles | 222/445 X |
| 2,713,507 | 7/1955 | Garlinghouse | 222/504 X |
| 3,380,475 | 4/1968 | Armstrong | 141/317 X |
| 3,410,422 | 11/1968 | Carpentier | 222/445 X |
| 3,414,312 | 12/1968 | Garlinghouse | 222/504 X |
| 3,556,358 | 1/1971 | Armstrong | 222/445 |
| 3,578,283 | 5/1971 | Jones | 222/504 X |
| 3,813,015 | 5/1974 | Armstrong | 222/504 X |

Primary Examiner—Stanley H. Tollberg
Assistant Examiner—John P. Shannon
Attorney, Agent, or Firm—Biebel, French & Bugg

[57] ABSTRACT

A fully enclosed lock gate type of valve for the control of the flow of dry particulate material is formed with an inside housing and a surrounding outer housing. The inside housing defines a conduit and extends between a valve inlet and a valve outlet. A pair of curved valve blades control the flow of material through the conduit and are positioned so as to define a predetermined space within the inner housing portion. The valve operating mechanism is fully enclosed between the inner and the outer housings. The outer housing has opposite offset portions which provide a space to receive the valve blades in the open position. These portions open into the valve outlet at the bottom of the valve so that they are self-cleaning. The valve blades are controlled by piston motors which are mounted on the outer housing with their piston rods extending into the offset portions to operate the valve blades. The fully enclosed lock gate valve is one which cannot leak to the outside and which prevents contamination to the material on the inside.

13 Claims, 8 Drawing Figures

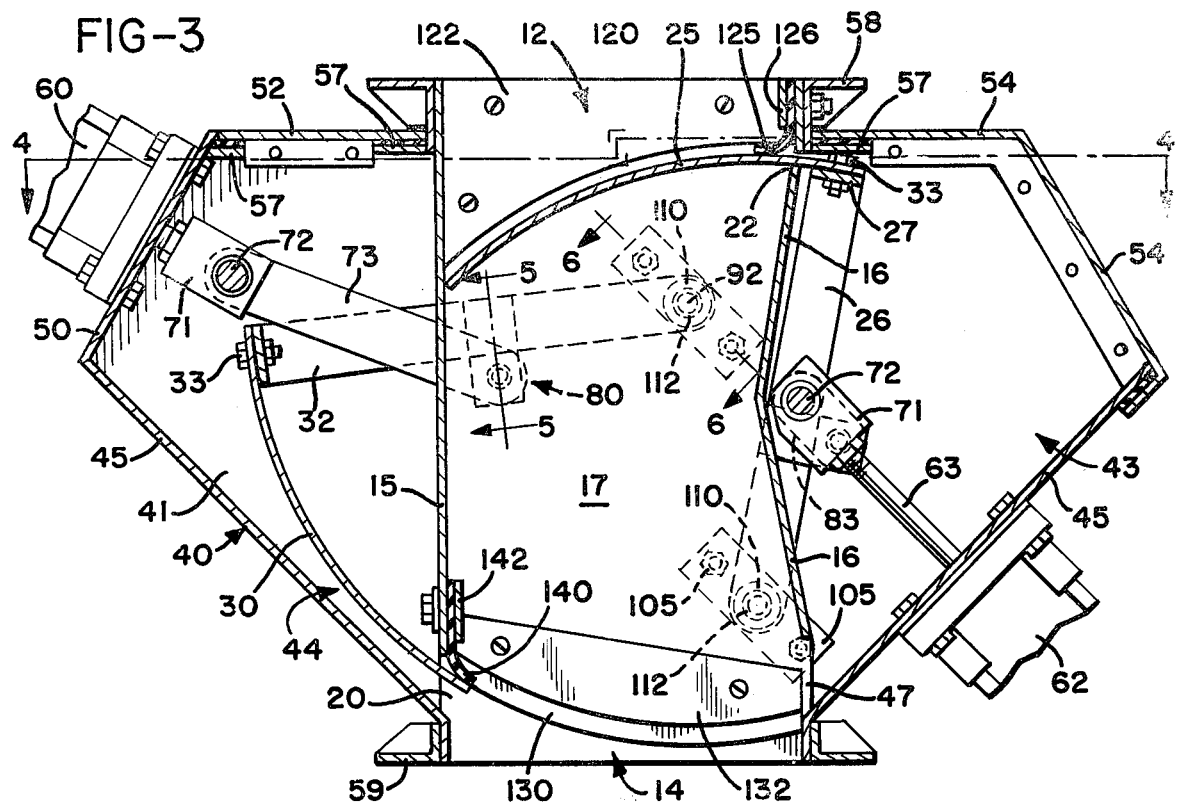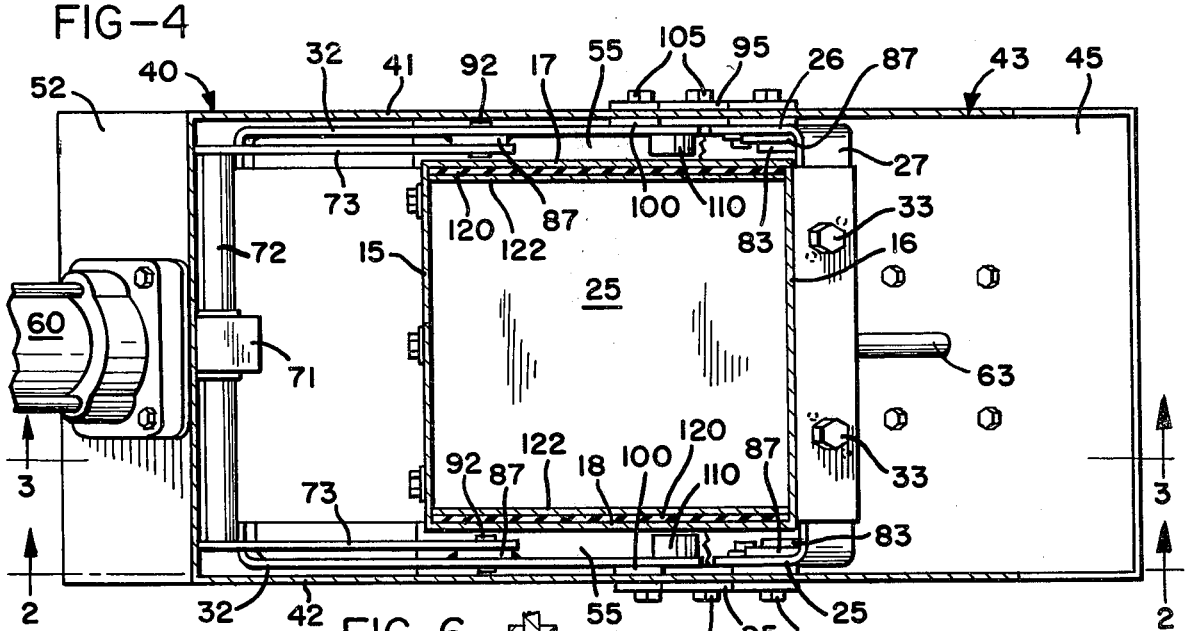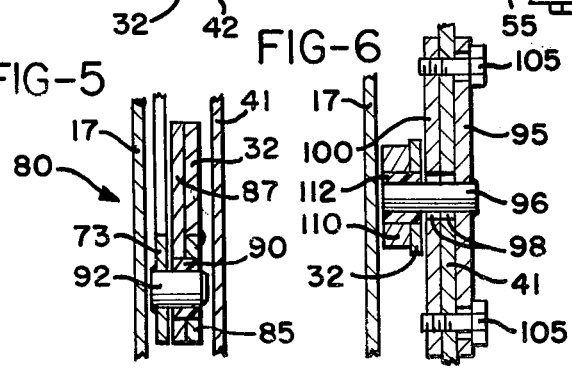

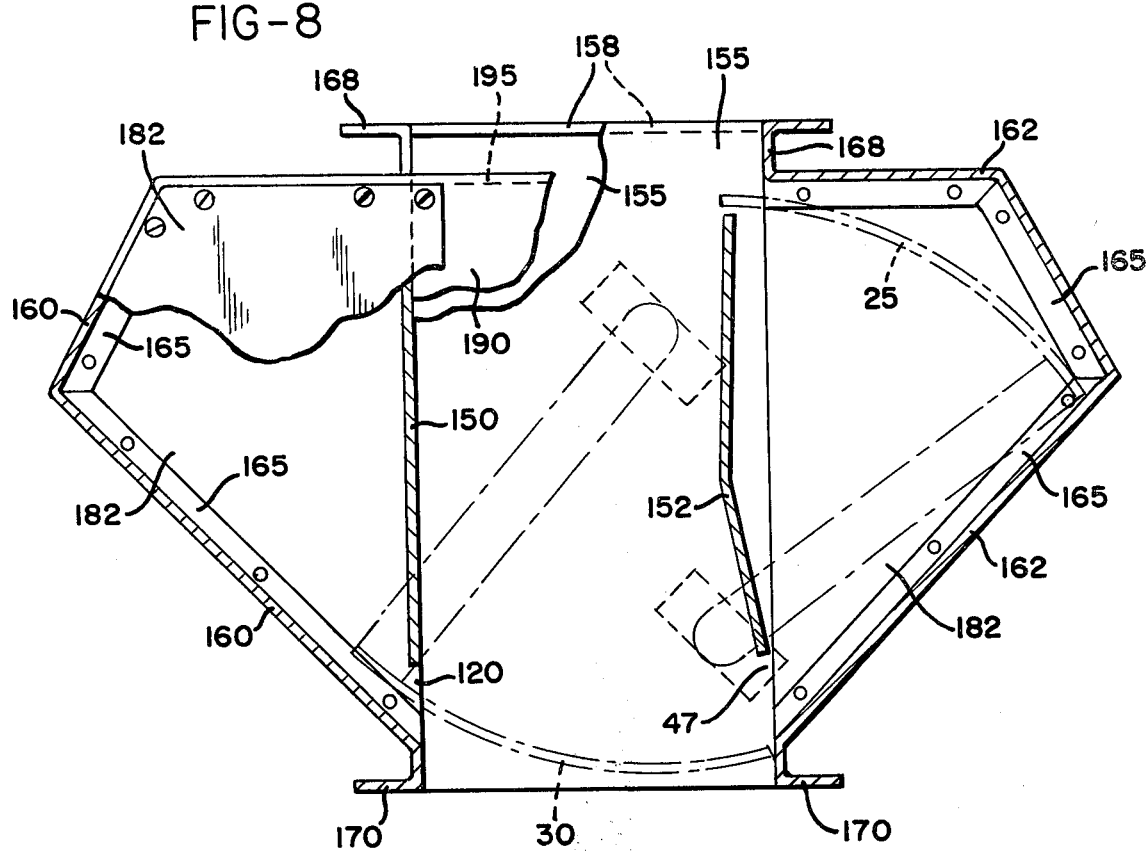

ENCLOSED LOCK GATE VALVE

BACKGROUND OF THE INVENTION

This invention relates to valves of the type which control the flow of dry particulate material, and more particularly to improvements in the valve construction as shown and claimed in my U.S. Pat. No. 3,813,015 issued May 28, 1974. In that patent, a lock gate flow control valve is shown which has upper and lower curved flow control blades movable through slots formed in a section of conduit between flow permitting and flow blocking positions, and a control circuit is disclosed by means of which the valve blade-operating cylinder motors are individually controlled for the sequential movement of the valve blades.

Another lock gate type flow control valve in which the valve blades are caused to be moved by the common cylinder motors is shown in my U.S. Pat. No. 3,556,358 issued Jan. 19, 1971.

In the valves of these prior patents, at least a portion of the blade operating mechanism is external to the valve body and is thus exposed. Also, since the blade slots open outwardly of the valve body, at least a portion of the valve blade is exposed outside the valve housing. While these valves have been highly advantageous for many purposes, there are some instances where it is desired to provide a fully enclosed valve so that there can be no chance of leakage of the material being handled to the outside and there can be no contamination of the handled material from the outside. It is also desirable to enclose the moving parts of the valve itself so that there is no danger to anyone or anything which may come into contact with the valve while it is operating.

SUMMARY OF THE INVENTION

This invention is directed to a fully enclosed lock gate valve useful for controlling the flow in measured quantities of dry particulate material, and for feeding material into a region of greater or lesser pressure. The valve includes an inside or a central housing portion which defines an axially elongated section of conduit through which the valve blades control the flow of material. The upper and lower flow control blades with the inside housing portion to define a space of predetermined volume therebetween.

The valve is further provided with an outer housing which substantially surrounds the inner housing and which provides a fixed support for the piston motors. The outer housing is provided with a pair of offset blade-receiving portions at opposite sides of the valve inner housing.

Each of the outer housing offset portions is configured so as to receive one of the curved flow-control blades in its open position. The blade support arms extend into the space between the inner and outer housings, and the entire connecting mechanism which connects the piston rods to the blade arms is fully enclosed. The offset housing portions are isolated from each other by means of internal baffling or partitions. Each of the outer housing portions opens at a tapered self-cleaning bottom wall into the valve outlet for self-cleaning.

The curved flow control blades are sealed at the blade slots and along the inner housing side walls. The blade supporting arms are mounted for pivotal movement on the walls of the outer housing and the arm support is adjustable for alignment of the blades.

It is accordingly an important object of this invention to provide a fully enclosed flow-control lock gate type of valve.

Another important object of the invention is to provide a lock gate flow control valve in which the piston motors are fixably mounted on an outer valve housing for driving a pair of curved flow control blades which move in flow blocking relation to an inner housing portion of the valve.

Other advantages of my invention include that of a totally enclosed valve with no leaks to the outside or the inside. Since the valve and its moving parts are enclosed, no guards or other protective equipment is necessary. The valve employs two blades and needs only two cylinders for operation. It has a straight-through internal design. The valve seals of my prior patents may be used, and a cam action valve blade mounting arrangement may be incorporated in the manner shown in my prior U.S. Pat. No. 3,380,475 issued Apr. 30, 1968. Identical blades and arms may be used for both the top and the bottom blades. The inner housing can be made of one material, such as stainless steel, while the other housing may be made of a different material, such as a mild steel. All of the outside seals are of the static type and the moving seals are simple wiping seals which need only be fully effective when the blades are closed.

These and other objects and advantages of the invention will be apparent from the following description, the accompanying drawings, and the appended claims.

BRIEF DESCRIPTION OF THE DRAWINGS

FIG. 3 is another vertical section looking generally along the line 3—3 of FIG. 4;

FIG. 4 is a transverse section of the valve looking generally along the line 4—4 of FIG. 3;

FIG. 5 is a fragmentary sectional detail taken generally along the line 5—5 of FIG. 3;

FIG. 6 is a further sectional detail taken along the line 6—6 of FIG. 3;

DESCRIPTION OF PREFERRED EMBODIMENTS

Figure 1:
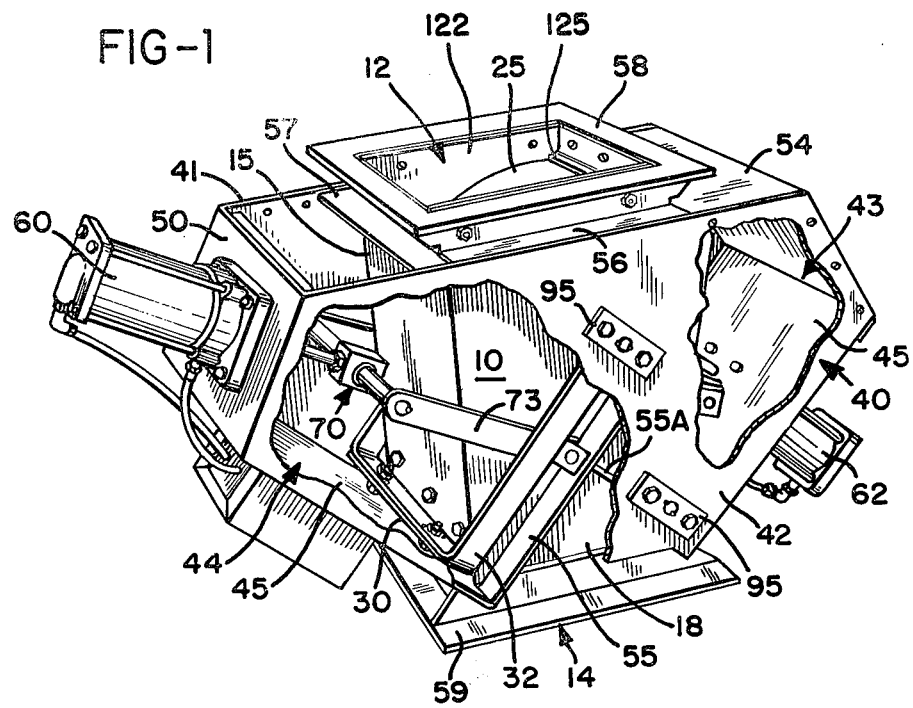
FIG. 1 is a perspective view, partially broken away, of a valve constructed according to my invention.

Referring to FIGS. 1–8, the improved lock gate valve of this invention includes an inside or inner housing 10 which is essentially an axially-elongated section of generally rectangular sheet metal construction, defining a flow conduit. The inner housing 10 thus has a front wall 15, a rear wall 16, and a pair of side walls 17 and 18, and extends between a valve inlet 12 and an outlet 14, as shown in FIG. 3 to control and guide the flow of dry particulate material.

The front and rear walls each define blade slots to receive curved flow control blades therethrough. The front wall 15 terminates to form a transverse blade slot 20 at the lower end thereof and adjacent the outlet 14. The rear wall 16 is formed with a transverse blade slot 22 adjacent the inlet 12.

The blade slot 22 receives a curved flow control blade 25 adjacent the inlet with its concave side facing toward the outlet 14. The outer end of the blade 25 is mounted on a generally U-shaped support arm 26, with an upper transverse section 27 of the arm supported on the lower exposed surface of the blade 25.

The blade slot 20 receives a second curve flow-control blade 30 therethrough. The blade 30 is positioned in inverted relation with respect to the blade 25, that is, with its concave side facing toward the inlet 12. The blade 30 is mounted on another U-shaped support arm 32. The blades 20 and 30 and their associated supporting arms 26 and 32 may be of identical construction. The arm 26 supports the upper blade 25 for movement through the upper slot 22 between a closed position shown in FIG. 3 and a retracted position shown in FIG. 2, while the arms 32 support the lower blade 30 for movement through the blade slot 20 between a retracted position shown in FIG. 3 and a closed position shown in FIG. 2. The blades 25 and 30 may be adjustably mounted on their respective support arms by the blade mounting adjusters as shown and described with respect to FIGS. 13–15 of my U.S. Pat. No. 3,799,187. The bolt attachments indicated at 33 in FIG. 3 are intended to refer to the attachment bolt (82) and the pair of adjusting set screws (86) of that patent.

The outer housing 40 is formed with a pair of sheet metal flat side walls 41 and 42 which are spaced respectively outwardly of the adjacent side walls 17 and 18 of the inner housing. The side walls 41 and 42 extend transversely beyond the front and back walls of the inner housing to define opposite offset portions 43 and 44 which are positioned, respectively, to receive the valve blades 25 and 30 in their fully open position.

The offset portions are generally similar in shape and each is formed with a transversely extending bottom tapered wall 45 which extends between the side walls 41 and 42 which open into the outlet 14. The bottom wall 45 of the left-hand offset portion 44 as viewed in FIG. 3, opens into the valve outlet 14, at the blade slot 20 below the blade 30 while the bottom wall of the right-hand offset portion 43 opens into the outlet 14 through a transverse clearance gap 47 defined between the wall 45 and the bottom edge of the back wall 16. The gap 47 is above the blade 30 and is isolated from the valve outlet when the valve blade 30 is closed. The sloping bottom walls 45 extend substantially 45° to the path of material flow through the valve, and are thus substantially self-cleaning of any material thereon.

The offset portion 44 has an inclined intermediate wall 50 and a flanged removable top closure 52 which joins with the inner housing 10 adjacent the inlet 12. On the other hand, the offset portion 43 is provided with a flanged removable cover 54 which joins the associated sloping wall 45 with the inner housing adjacent the inlet 12, and which has substantially the same configuration as the wall 50 and 52.

Figure 2:
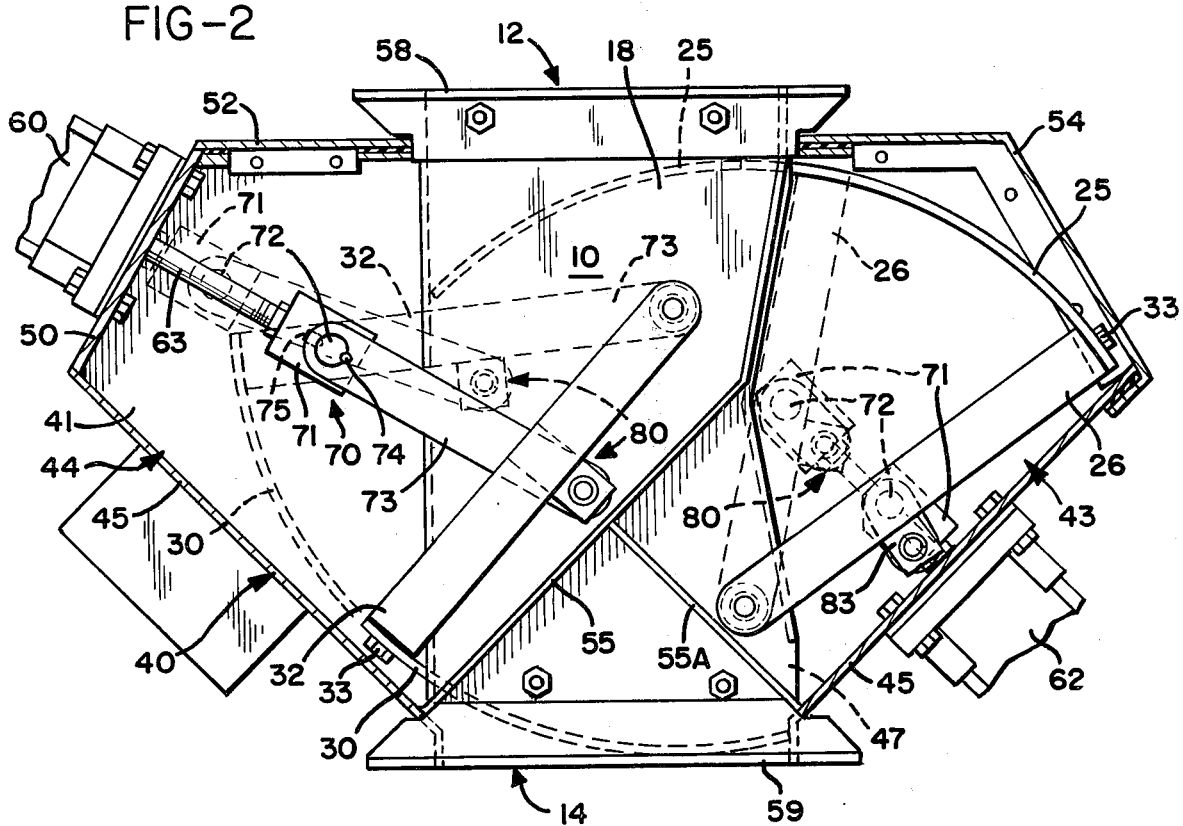
FIG. 2 is a vertical section looking generally along the line 2—2 of FIG. 4.

The offset housing portions are isolated from each other by means of a pair of divider partitions or walls 55 which extend somewhat laterally and vertically within the space between the side walls of the inner housing and the sides of the outer housing, from a point below the level of the blade slot 20 at the outlet 14 diagonally to a point above the level of the blade slot 22 at the inlet 12, as shown in FIGS. 1 and 2. The divider walls 55 prevent a transfer of pressure or leakage past the valve by flow through the offset portions when the valve blades are closed. The walls 55 are formed with branches 55A which extend diagonally to the bottom of the offset portion 43 and terminate below the level of the slot 47. The purpose of the branches 55A is to divert any material falling thereon and to prevent the formation of a stagnant pocket within the side walls within which the conveyed material could otherwise collect. Fillers or inserts 56 close the gap between the inner and outer housings at the top of the valve, and ledges 57 at the valve top provide support for the cover plates 52 and 54.

Means for mounting the valve in a conduit include a generally L-shaped mounting flange 58 which is positioned in surrounding relation to the valve inlet, and a second L-shaped mounting flange 59 which is positioned in surrounding relation to the outlet. Suitable bolt holes may be provided in the mounting flanges 58 and 59 for attachment to cooperating flanges on a conduit.

Direct motive power is applied to the blades 25 and 30 by a pair of fixed piston motors 60 and 62. The motor 60 is fixably mounted to the outside surface of the wall 50 of the offset portion 44 with the piston rod 63 thereof extending through the wall into the interior of the offset portion. The piston motor 62, on the other hand, is mounted on the outside surface of the wall 45 of the offset portion 43. It likewise has its piston rod extending through this wall into the interior of the offset portion.

The extended end of each of the piston rods 63 is adjustably threaded into identical block and crosstube assemblies 70, consisting of a threaded block 71 and a crosstube 72. The crosstube 72 is received in a bushing in the block 71 so that it is free to rotate in the block.

The opposite ends of the tube 72 for the piston motor 60 are fixably connected to a pair of drive links 73. The drive links 73 are fixed to the crosstube by any suitable means, such as by a stacking screw 74 and a set screw 75 (FIG. 2).

The links 73 are pivotally connected in driving relation to the arms 32 through an arm connector assembly generally indicated at 80. In a similar manner the opposite piston rod 63 is connected in driving relation to the arms 26 of the blade 25 through a pair of short links 83 and an identical pair of arm connector assemblies 80.

The connection of one of the links 73 at an assembly 80 is shown in cross-section in FIG. 5. The arm connector assembly includes an extension 85 which is welded to the lower surface of the blade arm 32, and an overlapping adjacent plate 87 is welded to the side of the arm 32 out to the extension 85. The plate 87 and the extension 85 define a common bearing support for a low friction bushing 90. A stub pin 92 is carried in an opening in the end of the connecting link 73 and extends into the bushing 90. The blade arms 32 and links 73 are captured in assembled relation on the pin 92 between the outside housing walls 41 and 42 and the adjacent side walls 17 and 18 of the inner housing 10. An identical arrangement connects the short links 82 to the arms 26 of the blade 25.

The invention further includes means for adjustably mounting the blade arms 26 and 32 for pivotal movement on the side walls 41 and 42 of the outer housing 40. For this purpose blade arm support plates 95 are provided with pins 96 which extend inwardly through an enlarged clearance opening 98 into the space between the inner and outer housing walls (FIG. 6) and through a clearance opening on an inside support plate 100. The arm pivot support plates 95 and 100 are adjustably mounted on the housing wall 41 or 42 by means of a pair of bolts 105 which also extend through enlarged clearance openings in the outer housing walls.

The blade support arms 26 and 32 are provided at their ends with collars 110 which receive a sleeve 112 of low friction bearing material mounted on the pins 96. The collars 110 form a close running fit with the adjacent inner housing side walls and effectively capture the blade support arms on the pins 96. Initial alignment of the blades and arms may be effected by suitable adjustment of the pin-supporting plates 95. Also, alignment of the blades on the arms may be affected by the adjusters 33 as described above.

The invention further includes means for sealing the blades 25 and 30 in their closed position with respect to the inner housing. For this purpose, the upper blade is sealed along the side walls 17 and 18 by a curved blade-conforming seal 120 which is retained in place by a conforming plate 122. The seal 120 may be of the type disclosed in my U.S. Pat. No. 3,799,187 and identified therein by the reference number 30, as this form of blade seal is particularly effective in forming a tight closure when the blade is closed. Alternatively, a blade-conforming cam plate may be employed of the type disclosed in my U.S. Pat. No. 3,380,475 and identified therein by the reference number 40. The cam plate type of blade seal is particularly effective where the blade itself is mounted so as to have a slight camming or lifting movement against the seal as the blade is closed. This is accomplished by mounting the pivot point of the blade slightly offset from its center of curvature, in the manner disclosed in my U.S. Pat. No. 3,380,475.

The upper blade 25 is sealed at the slot 22 by means of a transverse elastomeric wiper 125 which is received in overlying relation to the upper surface of the blade 25 on the back wall 16 of the inner housing. It extends between the opposite seal retainer plates 122 and is retained by a strip 126. The wiper seal 125 may be formed of any suitable flexible material, and while it is in running engagement with the blade 25 it is only necessary that it form a seal when the blade is closed. When the blade 25 is closed, the weight of the material on the blade also presses down on the seal 125 and assures that material will not pass thereby. If any material should pass through the slot 22 during the time that the blade 25 is in transit or is in its retracted position as shown in FIG. 2, this material will fall through the offset housing and down into the outlet 14 through the bottom slot 47.

The bottom blade 30 is similarly sealed to the inner housing by means of a pair of blade-conforming side seals 130 which may be formed identically to the seal 12 except with an opposite curvature. Thus, the seal 130 may be formed identically with the seal designated by the reference number 30A in my U.S. Pat. No. 3,399,187. A retainer plate 132 is employed to secure the seals 130 to the respective side walls 17 and 18. Alternatively, a cam-plate type of seal may be used in the same manner as described in connection with the blade 25. Further the blade 30 may also be mounted in offset relation to its center of curvature to provide a camming or closing action against the side seals, as described above and in my U.S. Pat. No. 3,380,475.

The blade slot 20 is also sealed when the blade 30 is in its closed position by means of a further curved blade wiper seal 140 which is mounted on the wall 15 by a retainer strip 142. The lower edge of the seal 140 is in wiping engagement with the upper surface of the blade 30 and extends transversely between the side seals 130. The lower portion of the blade slot 20, however, remains in communication with the outlet 14 so that any material which may find its way into the offset outer housing portion 42 may fall back into the outlet.

The piston motors 60 and 62 are caused to operate in a sequential manner so that the upper blade 25 opens and closes before the bottom blade 30 opens. A particularly useful circuit for sequentially controlling the blades of this invention is that which is described and claimed in my U.S. Pat. No. 3,813,015. In this application the cylinder 60 corresponds to either cylinder identified by the reference numbers 40 and 41 in that patent, while the cylinder 62 herein corresponds to either cylinder identified by the reference numbers 42 and 43 in that patent.

One of the important advantages of the blade actuating mechanism of this invention resides in the fact that the linkage is essentially in a straight-line condition with the cylinder rods 63 when the requirement for torque is the highest. It has been found that the highest torque requirement occurs when the valve blades are closed under loaded conditions and no material is flowing. Thus, under these conditions, the rods of the cylinders are in an essentially straight-line condition with the connecting links 73 and 83. Further, efficient use is made of the force available from the cylinders by the arrangement in which the connector assemblies 80 are positioned approximately midway of the length of the valve supporting arms. If a higher force is required, larger cylinders 60 and 62 can be used.

The valve of this invention can be constructed using only a single upper blade 25, the arms 26, and the piston 62. In this event, the offset portion 44 could be eliminated. Many of the advantages of the invention would be retained particularly that of a flow control valve employing a fully enclosed blade and arm supporting structure, using a fixed cylinder on the sloping wall 45 and a linkage mechanism in which the connecting links 83 are in an essentially straightline condition with the cylinder rod 63 when the valve blade 25 is in its closed position.

Figure 7:
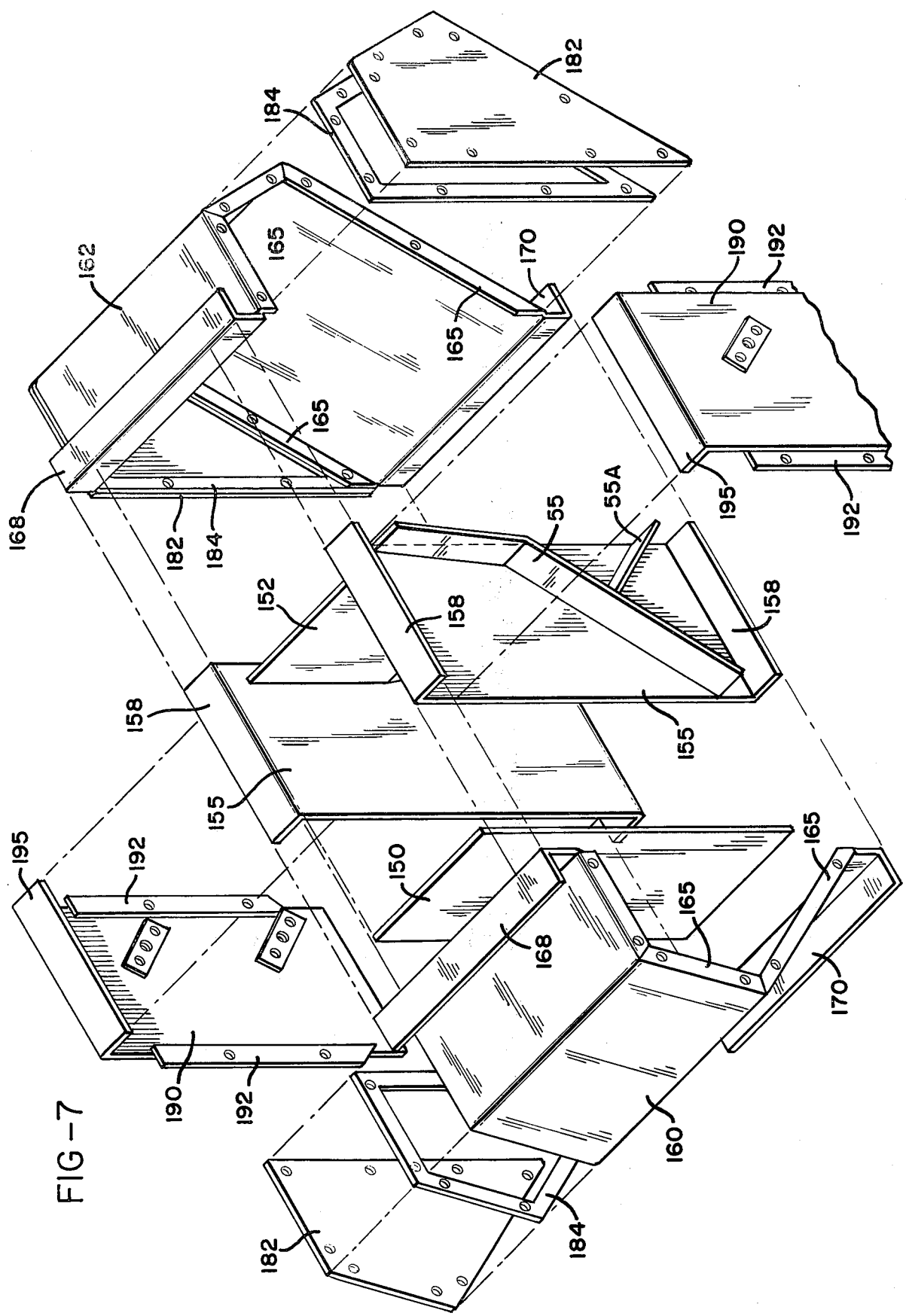
FIG. 7 is an exploded view of a somewhat modified housing for a valve according to this invention; and, FIG. 8 is an elevational view partially in section, of the modified valve housing of FIG. 8.

FIGS. 7 and 8 illustrate a somewhat modified and simplified housing arrangement for the valve of this invention. The housing construction of FIGS. 7 and 8 is particularly adapted to production on metal breaks or similar metal forming presses. The valve arms and blades, the connecting links, and the piston motors and other parts associated with the valve blades are omitted from FIG. 7, and the valves themselves are shown in broken line form in FIG. 8 in order to illustrate more clearly the details of the improved housing. The inner housing itself may be formed of sheet material including a simple plate for the front wall 150. The back wall 152 may similarly be formed of a plate of sheet material but provided with a slight bend to provide clearance for the connecting links which are associated with the cylinder 62. The side walls of the inner housing are similarly formed from sheet material. The side walls 155 are bent at right angles at their ends 158 to form the outwardly directed top and bottom mounting flanges along the sides of the valves. The four walls of the inner housing may be joined by welding to form a unitary box-like section. As noted above, the inner housing may be formed of a material which differs from that of the other housing. Thus, the sheet material making up the walls 150, 152, and 155 may be formed of stainless steel or may be provided with a coating as desired.

The end walls of the outer housing are also formed from a blank of sheet material. In this case, the opposite end walls 160 and 162 are in fact identical and may be made from a single piece of material with side flanges 165 bent in and with upwardly and outwardly directed opposite ends 168 and 170. The side plates of the outer housing, in this embodiment, are formed in three sections for each side. Thus, each side plate includes a pair of identical corner portions 182 which are removably received on the inwardly formed flanges 165 at the opposite sides of each of the offset portions 43 and 44 to provide access to the valve blades and arms. A gasket 184 may be positioned between the side plates 182 and the adjacent flanges 165. The side walls further include a pair of essentially identical center plates 190. The center plates 190 are the same except for the location of the holes therein to accept the pivotal mounting assemblies 80 for the blade supporting arms. Fastener strips 192 may be provided along the vertical edges of the center plates 190 for the purpose of providing a surface against which the adjacent side plates 182 are mounted.

The assembled housing may be seen by reference to the partial sectional view of FIG. 8 where it is noted that the front wall 150 of the inner housing terminates short of the lower end of the outer housing end wall 160 to form the aforementioned clearance gap 20 for the bottom blade. Similarly, the opposite back wall 152 terminates a short distance from the top of the valve to define the slot 22. Also the wall 152 terminates in spaced relation to the bottom of the adjacent end wall 162 to define with the opening 47.

Each of the center plates 190 is formed with inwardly turned ends 195 which act as spacers. The outer side wall sections 190 fit closely against the divider walls 55 and 55A so that the opposed outer housing portions are effectively isolated from each other when the valve blades are closed.

It will accordingly be seen that the embodiments of this invention provide an enclosed curved blade type of flow control valve in which an inner conduit or housing is completely free of blade-supporting projections in that the blade arms are adjustably supported for pivotal movement on the outer housing and are powered by piston means which are attached to the outer housing. Since, in the preferred embodiments, the housings are fabricated from sheet material, the ability to provide aligning adjustments of the blade and blade arms is important to assure that the blades themselves track properly with respect to the inner housing and the blade seals which are associated with the inner housing. Proper tracking and alignment is assured by the ability to adjust the blade-supporting pivots at the plates 95 and the bolts 105. In addition, the blade adjusting mechanisms 33 may be set so as to assure proper tracking and alignment of the blades.

A further advantage resides in the fact that all of the outside seals are simple static seals while the inside seals associated with the blades may be of simplest effective forms. Thus, drop-in side seals of the type identified by the reference numeral 40 in my prior U.S. Pat. No. 3,380,475 may be employed or, alternatively, the self-actuating type of side seal identified by the reference numeral 30 in my U.S. Pat. No. 3,799,187 may be employed. In order to provide even more effective sealing the blades may be given a cam-like action by offset mounting as disclosed in my Pat. No. 3,380,475. It will be appreciated that the blade seals need only become fully effective when the blades are in their closed positions since all inside and outside leakage has been eliminated. Thus, this further simplifies the task of sealing the blades to the housings and further provides a flow control valve which maintains an effective seal over an extended period of use.

The pressure in the offset portion 44 is equal to the pressure at the valve outlet 14 at all times so that when the bottom blade 30 is open and the pressure into the conduit section becomes the same as that of the outlet, there is little tendency for leakage at the seal 140 or for the material to flow into the cavity defined by the offset portion 44. Also, when the blade 30 is open, the pressure in the cavity defined by the offset portion 43 is the same as that of the portion 44, and accordingly, there will be little tendency for material to be forced into the offset portion 43. Since the pressure in the portion 43 is that of the conduit section 17 during filling, there is little tendency for material to be forced by the seal 125 during opening and closing movements of the upper blade 25.

A further advantage of my preferred embodiments resides in the fact that only two piston motors are required to operate a two-blade embodiment, that is one piston motor for each blade. This further simplifies assembly and reduces cost. Also, effective use is made of the power of the piston motors due to the fact that the points of connection provide high leverage on the valve blades and due to the essentially straight-line actuating condition between the piston rods and the connecting links at the positions of the blades where the highest torque is demanded.

While the forms of apparatus herein described constitute preferred embodiments of the invention, it is to be understood that this invention is not limited to these precise forms of apparatus, and that changes may be made therein without departing from the scope of the invention.

What is claimed is:

1. A lock gate valve comprising a valve body including an inner housing, said inner housing defining an obstruction free section of conduit extending between an inlet and an outlet, said valve body further including an outer housing substantially surrounding and enclosing said inner housing and defining blade-receiving spaces within said inner housing, means defining a first blade receiving slot through said body adjacent said inlet to receive a first flow control blade therethrough, means defining a second blade receiving slot in said body adjacent said outlet to receive a second flow control blade therethrough, a first curved flow control blade extending through said first slot adjacent said inlet, support means on said outer housing supporting said first blade for pivotal movement between a closed position extending across said inlet and a retracted position in which a substantial portion of said first blade is received in one of said blade-receiving spaces, a second flow control blade extending through said second slot adjacent said outlet, means on said outer housing supporting said second blade for movement between a closed position extending across said outlet and a retracted position in which a substantial portion thereof extends into the other of said blade-receiving spaces, and blade seal means between said inner housing and said blades for sealing said blades at said inner housing in said closed positions.

2. The lock gate of claim 1 in which said blades are carried on supporting arms pivotally and adjustably mounted to said outer housing for alignment with said inner housing.

3. The lock gate of claim 2 further including a pair of piston motors, one for each of said blades, means mounting said piston motors to said outer housing with the piston rods thereof extending into the said spaces, and blade connector means between said blades and said piston rods.

4. The lock gate of claim 3 in which said blade connecting means each comprise a transverse member connected to said rod and a pair of pivoted links connecting the associated said arms to said transverse member.

5. An improved lock gate valve comprising inner housing means defining an axially elongated section of generally rectangular conduit extending between an inlet and an outlet, outer housing means substantially surrounding and enclosing said inner housing means, said outer housing means having blade receiving offset portions formed at opposite sides of said inner housing means, means isolating said offset portions from each other, means defining a first blade receiving slot through said inner housing means adjacent said inlet to receive a first flow control blade therethrough and defining a second blade receiving slot adjacent said outlet to receive a second flow control blade therethrough, said slots being associated with opposite walls of said inner housing means and each opening into one of said offset portions, a first curved flow control blade extending through said first slot adjacent said inlet with the concave side side thereof facing said outlet, support arm means supporting said first blade for pivotal movement between a closed position extending across said inlet and a retracted position in which a substantial portion of said first blade is received in one of said offset portions, a second curved flow control blade extending through said second slot adjacent said outlet with the concave side thereof facing said inlet, arm means supporting said second blade for movement between a closed position extending across said outlet and a retracted position in which a substantial portion of said blade extends into said outer housing portion, and blade seal means between said inner housing means and said blades in the closed position thereof for sealing said blades in said closed position at the walls of said inner housing means.

6. The valve of claim 5 in which each of said outer housing offset portions is formed with a tapered bottom wall extending at an angle to be substantially self-cleaning and opening into said outlet.

7. An improved lock gate valve comprising an inner housing means defining an axially elongated section of generally rectangular conduit extending between an inlet and an outlet, an outer housing having generally flat side walls spaced from said conduit and transverse end walls, said outer housing substantially surrounding and enclosing said inner housing means having blade receiving offset portions formed at opposite sides of said inner housing, divider means between said side walls and said inner housing isolating said offset portions from each other, means in said inner housing defining a first blade slot adjacent said inlet proportioned to receive a first curved flow control blade therethrough and defining a second blade receiving slot adjacent said outlet to receive a second curved flow control blade therethrough, a first curved flow control blade extending through said first slot adjacent said inlet with the concave side thereof facing said outlet, support arms pivotally mounted on said side walls and supporting said first blade for pivotal movement between a closed position extending across said inlet and a retracted position in which a substantial portion of said first blade is received in one of said offset portions, a second curved flow control blade extending through said second slot adjacent said outlet with the concave side thereof facing said inlet, support arms pivoted on said walls and supporting said second blade for movement between a closed position extending across said outlet and a retracted position in which a substantial portion of said blade extends into said outer housing portion, and blade seal means between said inner housing means and said blades in the closed position thereof for sealing said blades in said closed position at the walls of said inner housing means.

8. An improved lock gate valve comprising inner housing means defining an axially elongated section of conduit extending between an inlet and an outlet, outer housing means substantially surrounding and enclosing said inner housing means, said outer housing means having separate blade receiving offset portions positioned on opposite sides of said inner housing means, means defining a first blade receiving slot through said inner housing means adjacent said inlet to receive a first flow control blade therethrough, means defining a second blade receiving slot adjacent said outlet to receive a second flow control blade therethrough, said slot means each opening into one of said offset portions, a first flow control blade extending through said first slot adjacent said inlet, support means supporting said first blade for pivotal movement between a closed position extending across said inlet and a retracted position in which a substantial portion of said first blade is received in one of said offset portions, a second flow control blade extending through said second slot adjacent said outlet, means supporting said second blade for movement between a closed position extending across said outlet and a retracted position in which a substantial portion of said second blade extends into the other of said outer housing portions, and blade seal means between said inner housing means and said blades for sealing said blades at said inner housing means in said closed positions.

9. An enclosed valve for controlling the flow of dry particulate material, comprising means defining a conduit section having an inlet and an outlet, at least one curved flow control valve blade, means in said conduit defining a blade slot for receiving said blade therethrough, blade supporting arm means, an offset outer housing fully enclosing said blade and said blade supporting arm means, means mounting said arm means providing for pivotal movement of said blade through said slot between flow permitting and flow blocking positions relative to said conduit, said outer housing having a tapered wall, a fixed cylinder mounted exteriorly on said wall with its piston rod extending therethrough, and connector link means connecting said rod to said blade at said arms to effect said movement thereof.

10. The valve of claim 9 in which said connector link means includes a cross member on said rod and a pair of pivot links between the ends of said member and said blade arms and in which said cylinder rod and said links are in essentially a straight-line condition when said valve blade is in its flow blocking position.

11. An enclosed valve for controlling the flow of dry particulate material, comprising housing means defining an unobstructed conduit section having an inlet and an outlet, at least one curved flow control valve blade, blade supporting arm means, an outer housing fully enclosing said blade and said blade supporting arm means and defining a valve clearance space with said conduit section, means on said outer housing adjustably mounting said arm means providing for pivotal movement of said blade in said clearance space between flow permitting and flow blocking positions relative to said conduit, a fixed cylinder mounted exteriorly of said valve on said outer housing with its piston rod extending into said space, and connector link means connecting said rod to said blade at said arms to effect said movement thereof.

12. An enclosed valve housing construction formed of sheet metal for curved-blade flow control valves, in which a pair of arm-mounted valve blades cooperate with a valve housing to define a space therebetween, comprising:
- a central conduit portion forming a generally rectangular inner housing leading from an inlet to an outlet and having a pair of side walls, a front wall, and a back wall;
- a pair of valve blade-receiving offset housing portions positioned respectively opposite said front and back walls;
- said offset housing portions each having an outer wall formed as a continuous piece of metal extending between said inlet and said outlet; and
- each said offset housing portion further having means defining a pair of side plates joining with the associated said outer wall for closing the space therein.

13. An enclosed valve housing construction formed of sheet metal for curved-blade flow control valves, in which a pair of arm-mounted valve blades cooperate with a valve housing to define a space therebetween, comprising:
- a central conduit portion forming an inner housing leading from an inlet to an outlet and having means defining a pair of side walls, a front wall, and a back wall;
- a pair of valve blade-receiving offset housing portions positioned respectively opposite said front and back walls;
- said offset housing portions each having a one-piece outer wall extending on said conduit portions from positions adjacent said inlet to positions adjacent said outlet;
- each said offset portion further having a pair of side plates joining with the associated said outer wall for closing the space therein; and
- a pair of opposite central plates positioned outwardly of and adjacent to said inner conduit side walls defining a clearance space with the adjacent side wall of the inner housing and having marginal edges joining with said side plates and providing pivot locations for the pivotal mounting of the valve blade arms in said clearance space.

* * * * *

UNITED STATES PATENT AND TRADEMARK OFFICE
CERTIFICATE OF CORRECTION

PATENT NO. : 3,907,178
DATED : September 23, 1975
INVENTOR(S) : George W. Armstrong It is certified that error appears in the above–identified patent and that said Letters Patent are hereby corrected as shown below:

Column 1, line 45, insert -- cooperate -- after "blades".

Signed and Sealed this sixteenth Day of December 1975

[SEAL]

Attest:

RUTH C. MASON
*Attesting Officer*

C. MARSHALL DANN
*Commissioner of Patents and Trademarks*